M. KELLY.

WIRE-FENCE.

No. 6,902.

Reissued Feb. 8, 1876

Witnesses:

Wm. C. Dey.

E. Volkmann.

Inventor:

M. Kelly by his attorney

Thomas D. Stetson

THE NORRIS PETERS CO., PHOTO-LITHO., WASHINGTON, D. C.

UNITED STATES PATENT OFFICE.

MICHAEL KELLY, OF NEW YORK, N. Y., ASSIGNOR, BY MESNE ASSIGNMENTS, TO WILLIAM T. CALKINS.

IMPROVEMENT IN WIRE FENCES.

Specification forming part of Letters Patent No. 74,379, dated February 11, 1868; reissue No. 6,902, dated February 8, 1876; application filed April 2, 1875.

*To all whom it may concern:*

Be it known that I, MICHAEL KELLY, of the city, county, and State of New York, have invented certain new and useful Improvements in Fences; and I do hereby declare the following to be a full and exact description thereof.

My invention relates to imparting to fences of wire a character approximating to that of a thorn-hedge. I prefer to designate the fence so produced as a "thorny fence."

I will first describe what I consider the best means of carrying out my invention, and will after designate the points which I believe to be new therein.

The accompanying drawings form a part of this specification.

Figure 1:
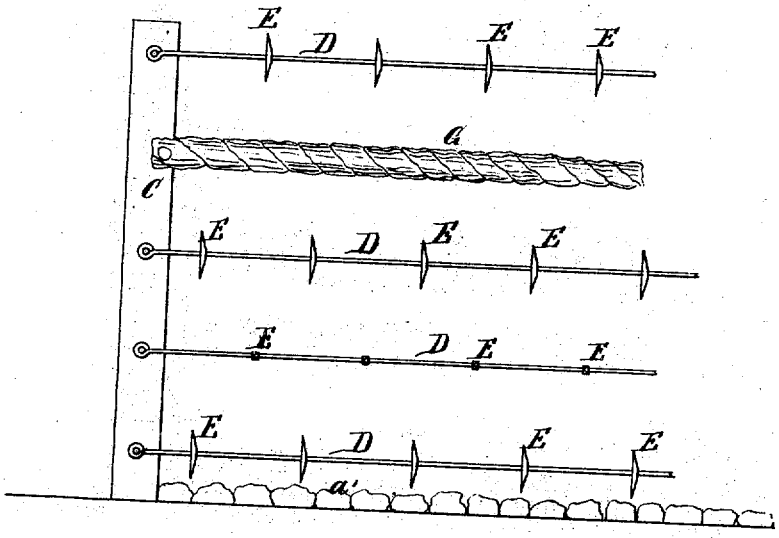
Figure 2:
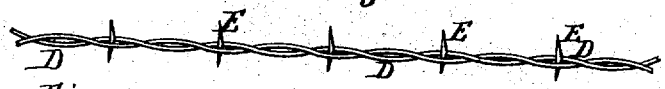
Figure 3:
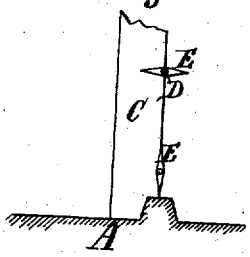
Figure 4:
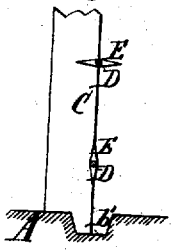
Figures 5, 6, 7, 8:
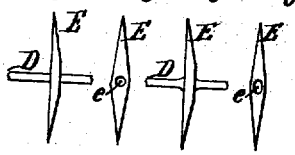

Figure 1 is a side view of a portion of my fence complete, using single wires. Fig. 2 represents double wires, which may be used, if preferred. Fig. 3 is a cross-section of the base of the fence. Fig. 4 is a cross-section of a modification. Fig. 5 is an edge view of one of the thorns before being fixed or secured in place on the wire. Fig. 6 is a face view of the same. Fig. 7 is an edge view of the same thorn after being flattened, together with the wire to affix or secure it in place on the wire. Fig. 8 is a corresponding face view, showing the thorn and the wire in the flattened condition.

Similar letters of reference indicate corresponding parts in all the figures.

A represents the earth, and *a'* a ridge, formed of stone, earth, turf, or other material, which, in addition to increasing the tightness of the fence at the bottom, performs an important function, as in all wire fences, by aiding and indicating to animals the locality of the fence, and thus to avoid their unconsciously running against it. In cases where it is not convenient to raise a ridge in this manner, a ditch may be dug, as indicated by *b'* in Fig. 4, which will aid to perform the latter function. C indicates one of the posts of the fence, which may be made of hard wood, or any other suitable material, and planted in the earth in the ordinary manner. D D, &c., are wires, preferably of galvanized iron. I prefer No. 15, but a larger or smaller wire may be used with effect. These wires are stretched from post to post, and secured thereon by any of the ordinary means. They would form, in the absence of the thorns, a wire fence of the ordinary approved construction, but with the wires somewhat lighter than usual. E E, &c., are small pieces of iron or steel, by preference hard iron tinned. They are cut from a plate by machinery, or are otherwise produced cheaply and in large quantities, and are each provided with a hole, *e*, corresponding to the size of the wire, but a little larger, so that they may be introduced easily upon the wire, either by proper machinery or by hand. These pieces, after being strung on the wire at distances about six inches apart, are compressed laterally upon the wire by a blow of a hammer, or otherwise, so as to flatten the hole *e*, and also correspondingly flatten the wire at the point where this adjunct is to stand. I term these pieces "thorns," and it will be observed that each presents two sharp points. They may be so placed that they will all stand in the same plane, or they may stand irregularly in many different planes. I prefer the latter arrangement. The wire thus provided with the sharp points or thorns serves in the ordinary manner, with the addition of possessing an offensive character, which will soon teach cattle to respect it, and not attempt to force it. The wire may be put up with these thorns previously attached and secured in their places, or they may be put on loosely, and they may be distributed and secured after the fence is erected. I prefer the former arrangement.

Where it is desirable to increase the strength of the wire, I lay another wire, of the same or a different size, alongside of a thorn-wire, and twist the two together by any suitable mechanism. This construction is represented in Fig. 2. It locks the thorn, and also tends to insure a regularity in the distribution of the points in many different directions.

I propose, in some instances, to attach to the posts C, in addition to the thorn-wires, a rope of twisted hay, or other suitable cheap material, saturated with tar or analogous material, as indicated by G in Fig. 1. Such ropes are well known, and may be cheaply and roughly made by farmers and others requiring to use them, and they may be secured in any convenient manner upon the fence. The wires and thorns being quite small, and not easily to be seen by cattle, especially in the night, the tarred rope performs an important function in aiding the senses of sight and of smell in detecting the presence of the fence.

My fence may be used with fewer posts than the ordinary wire fences, partly because of the reduced weight and reduced action of the wind thereon, due to the smallness of the wire, and partly because of the effect of the thorns in preventing animals from pressing against it.

I can, by this invention, make an efficient fence from unconnected wires six inches apart, fixing the artificial thorns on the wires four inches apart. This fence takes only one-fourth as much wire as in ordinary wire fences, yet it is more efficient. This fence will weigh about one-eighth ($\frac{1}{8}$) as much as ordinary connected wire-fence, by which I mean those woven or twisted together. It can be wound on a reel, like telegraph-wire, and a farmer can transport as much in a single wagon-load as will serve to build fences for a large farm.

It will be observed that the drawings of the fence complete show the thorns larger in proportion than they are intended to be in practice. This could not well be avoided in the drawing. I may remark that I propose in all ordinary cases to make the thorns about five-eighths of an inch in the entire length, from point to point; but this may be varied, as required in different cases.

Some of the advantages of my invention may be secured by simply stringing the thorns on cords of hemp, or other analogous material, holding them in place by twisting two or more cords together. Such thorny cords may be used in connection with my large rope G, where wire is not available, or for camp uses and the like, where the superior flexibility of wire will compensate for its inferiority in general points to the wires described.

Having now fully described my invention, what I claim as new, and desire to secure by Letters Patent, is as follows:

1. I claim the combination, substantially as described, of the fence-wire D, and a series of thorns, E, rigidly fixed thereto, for the purpose herein set forth.

2. I claim a wire, D, and a series of fixed thorns thereon, in combination with supporting-posts C, substantially as and for the purpose set forth.

3. I claim the within-described fence, formed by the combination of the thorny parts D and E with suitable posts C, and with the addition of the large rope G, adapted for joint operation, as and for the purpose herein specified.

4. I claim the combination, substantially as described, of two wires, D D′, twisted together, and a series of thorns, E, strung upon one of said wires, and held in position by them, as and for the purpose set forth.

In testimony whereof I have hereunto set my hand this 23d day of January, 1875, in the presence of two subscribing witnesses.

MICHAEL KELLY.

Witnesses:

WM. C. DEY,

ED. VOLKMANN.